(12) United States Patent
Mudgil et al.

(10) Patent No.: US 11,956,278 B2
(45) Date of Patent: *Apr. 9, 2024

(54) IDENTIFYING SUSPICIOUS ENTRIES IN A DOCUMENT MANAGEMENT SYSTEM

(71) Applicant: Tekion Corp, Pleasanton, CA (US)

(72) Inventors: Satyavrat Mudgil, Bengaluru (IN); Anant Sitaram, San Ramon, CA (US); Ved Surtani, Gurgaon (IN)

(73) Assignee: Tekion Corp, Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/159,038

(22) Filed: Jan. 24, 2023

(65) Prior Publication Data
US 2023/0164192 A1  May 25, 2023

Related U.S. Application Data

(63) Continuation of application No. 17/234,362, filed on Apr. 19, 2021, now Pat. No. 11,595,446.

(51) Int. Cl.
| | |
|---|---|
| *G06N 3/08* | (2023.01) |
| *G06F 21/00* | (2013.01) |
| *G06F 21/55* | (2013.01) |
| *G06F 21/60* | (2013.01) |
| *H04L 9/40* | (2022.01) |

(52) U.S. Cl.
CPC ............ *H04L 63/20* (2013.01); *G06F 21/00* (2013.01); *G06F 21/55* (2013.01); *G06F 21/60* (2013.01); *G06N 3/08* (2013.01); *H04L 63/1416* (2013.01)

(58) Field of Classification Search
CPC ..... H04L 63/20; H04L 63/1416; G06F 21/00; G06F 21/55; G06F 21/60; G06N 3/08
See application file for complete search history.

(56) References Cited

U.S. PATENT DOCUMENTS

| | | | |
|---|---|---|---|
| 10,050,998 B1 * | 8/2018 | Singh | .................... H04L 63/145 |
| 10,630,706 B2 | 4/2020 | Reddy et al. | |
| 10,825,028 B1 | 11/2020 | Kramme et al. | |
| 10,924,503 B1 * | 2/2021 | Pereira | .................... H04L 63/20 |
| 10,972,505 B2 | 4/2021 | Palumbo et al. | |
| 10,972,508 B1 | 4/2021 | Dods | |
| 2009/0106836 A1 | 4/2009 | Toshima et al. | |

(Continued)

FOREIGN PATENT DOCUMENTS

| | | | |
|---|---|---|---|
| WO | WO 2020/132137 A1 | 6/2020 | |
| WO | WO 2020/167691 A1 | 8/2020 | |

OTHER PUBLICATIONS

Arntz, Explained: YARA rules, https://blog.malwarebytes.com/security-world/technology/2017/09/explained-yara-rules/, 2017 (Year: 2017).*

(Continued)

*Primary Examiner* — Robert B Leung
*Assistant Examiner* — Howard H. Louie
(74) *Attorney, Agent, or Firm* — Fenwick & West LLP

(57) ABSTRACT

A document management system manages documents of an entity. The document management system monitors for entries in a document that are suspicious. Entries in the document are classified by the document management system as a "suspicious entry" or a "non-suspicious entry." In one embodiment, a suspicious entry is indicative of potentially suspicious activity at the entity.

17 Claims, 11 Drawing Sheets

Suspicious Entries

| | Status | ID | Type | Date | Reference | Description | Value | Created By | Journal No. | Suspicious? |
|---|---|---|---|---|---|---|---|---|---|---|
| ☐ | Posted | 123 | Type 1 | 11/30/20 | Reference 1 | XYX | 1234 | John Doe | Journal 1 | ▽ |
| ☐ | Posted | 122 | Type 2 | 11/30/20 | Reference 1 | ADJB | 5498 | Jane Doe | Journal 3 | YES / No |
| ☐ | Posted | 121 | Type 3 | 11/30/20 | Reference 1 | SGDA | 8746 | John Doe | Journal 1 | ▽ |

(56) References Cited

U.S. PATENT DOCUMENTS

| | | |
|---|---|---|
| 2018/0285566 A1 | 10/2018 | Borlick et al. |
| 2019/0020687 A1* | 1/2019 | Noon .................... H04L 51/212 |
| 2019/0377624 A1* | 12/2019 | Li ........................ G06F 11/0772 |
| 2021/0065193 A1* | 3/2021 | Kang .................... G06Q 20/389 |
| 2021/0176181 A1 | 6/2021 | Arora |
| 2021/0200955 A1 | 7/2021 | Ben Kimon et al. |
| 2021/0390629 A1 | 12/2021 | Bildner et al. |

OTHER PUBLICATIONS

Adobe, https://web.archive.org/web/20140530011049/http://helpx.adobe.com/acrobat/using/enhanced-security-setting-pdfs.html#enhanced_security_setting_for_pdfs, https://web.archive.org/web/20140602043628/https://helpx.adobe.com/acrobat/using/security-warnings-pdf-opens.html (Year: 2014).

Arntz, Explained: YARA rules, https://blog.malwarebytes.com/security-world/technology/2017/09/explained-yara-rules/ (Year: 2017).

International Search Report and Written Opinion, Patent Cooperation Treaty Application No. PCT/US2022/023508, dated Jul. 19, 2022, 9 pages.

United States Office Action, U.S. Appl. No. 17/234,362, dated Jul. 1, 2021, 31 pages.

United States Office Action, U.S. Appl. No. 17/234,362, dated Sep. 27, 2021, 35 pages.

United States Office Action, U.S. Appl. No. 17/234,362, dated Feb. 10, 2022, 36 pages.

United States Office Action, U.S. Appl. No. 17/234,362, dated May 18, 2022, 35 pages.

\* cited by examiner

Journal Entries

Journal Name: Journal 1  Date Range Sept 01, 2020 – Dec 05, 2020  432 Results

Alerts  Create Journal Entry

Search

| | Status | ID | Type | Date | Reference | Description | Value | Created By | Journal No. |
|---|---|---|---|---|---|---|---|---|---|
| ☐ | Posted | 123 | Type 1 | 11/30/20 | Reference 1 | XYX | 1234 | John Doe | Journal 1 |
| ☐ | Posted | 122 | Type 2 | 11/30/20 | Reference 1 | ADJB | 5498 | John Doe | Journal 1 |
| ☐ | Posted | 121 | Type 3 | 11/30/20 | Reference 1 | SGDA | 8746 | John Doe | Journal 1 |
| ☐ | Posted | 120 | Type 2 | 11/30/20 | Reference 1 | DAGD | 4811 | John Doe | Journal 1 |
| ☐ | Posted | 119 | Type 2 | 11/30/20 | Reference 1 | DGSG | 9887 | John Doe | Journal 1 |
| ☐ | Posted | 118 | Type 3 | 11/30/20 | Reference 2 | JJLFD | 2487 | John Doe | Journal 1 |
| ☐ | Posted | 117 | Type 1 | 11/30/20 | Reference 2 | NNOHI | 7891 | John Doe | Journal 1 |
| ☐ | Posted | 116 | Type 1 | 11/30/20 | Reference 2 | GHRE | 18544 | John Doe | Journal 1 |
| ☐ | Posted | 115 | Type 3 | 11/30/20 | Reference 2 | HFNRR | 9987 | John Doe | Journal 1 |
| ☐ | Posted | 114 | Type 1 | 11/29/20 | Reference 3 | NRER | 777 | John Doe | Journal 1 |

Journal Entry - 553549

General Information

Enterprise: Enterprise 1

Journal Number/Name: Journal 1

Document Type: Type 1

Description: Type here

Reference Type: Reference Type 1

Reference: Reference Number

Posting Lines

| Data Type 1: Value | Data Type 2: Value | Data Type 3: Value |
|---|---|---|
| Identifier | Value | Description |
| Identifier 1 | Value 1 | Description 1 |
| Identifier 2 | Value 3 | Description 2 |
| Identifier 3 | Value 4 | Description 3 |

Security Policy

User Defined Rules

| Identifier | Classification Type | Rule Attribute | Rule Attribute |
|---|---|---|---|
| Identifier 1 | Suspicious Entry ▷ | Monday to Friday | Before 8 AM and after 5 PM |

Dynamic Rules

| Identifier | Classification Type | Rule Attribute | Rule Attribute |
|---|---|---|---|
| Identifier 5 | Suspicious Entry ▷ | Less than X% of Value | |
| Identifier 3 | Suspicious Entry ▷ | Group 1 | Group 2 |
| All | Suspicious Entry ▷ | Africa | South America |

601 — User Defined Rules section
603A, 603B, 603C — Dynamic Rules rows

FIG. 6

Journal Entries

Journal Name: Journal 1    Date Range Sept 01, 2020 – Dec 05, 2020    432 Res...    Alerts    Create Journal Entry Suspicious Entries — 701    Search

| | Status | ID | Type | Date | Reference | Description | Value | Created By | Journal No. |
|---|---|---|---|---|---|---|---|---|---|
| ☐ | Posted | 123 | Type 1 | 11/30/20 | Reference 1 | XYX | 1234 | John Doe | Journal 1 |
| ☐ | Posted | 122 | Type 2 | 11/30/20 | Reference 1 | ADJB | 5498 | John Doe | Journal 1 |
| ☐ | Posted | 121 | Type 3 | 11/30/20 | Reference 1 | SGDA | 8746 | John Doe | Journal 1 |
| ☐ | Posted | 120 | Type 2 | 11/30/20 | Reference 1 | DAGD | 4811 | John Doe | Journal 1 |
| ☐ | Posted | 119 | Type 2 | 11/30/20 | Reference 2 | DGSG | 9887 | John Doe | Journal 1 |
| ☐ | Posted | 118 | Type 3 | 11/30/20 | Reference 2 | JJLFD | 2487 | John Doe | Journal 1 |
| ☐ | Posted | 117 | Type 1 | 11/30/20 | Reference 2 | NNOHI | 7891 | John Doe | Journal 1 |
| ☐ | Posted | 116 | Type 1 | 11/30/20 | Reference 2 | GHRE | 18544 | John Doe | Journal 1 |
| ☐ | Posted | 115 | Type 3 | 11/30/20 | Reference 2 | HFNRR | 9987 | John Doe | Journal 1 |
| ☐ | Posted | 114 | Type 1 | 11/29/20 | Reference 3 | NRER | 777 | John Doe | Journal 1 |

Suspicious Entries 800

| | Status | ID | Type | Date | Reference | Description | Value | Created By | Journal No. | Suspicious? |
|---|---|---|---|---|---|---|---|---|---|---|
| ☐ | | | | | | | | | | ▽ — 801 |
| ☐ | Posted | 123 | Type 1 | 11/30/20 | Reference 1 | XYX | 1234 | John Doe | Journal 1 | YES |
| ☐ | Posted | 122 | Type 2 | 11/30/20 | Reference 1 | ADJB | 5498 | Jane Doe | Journal 3 | No |
| ☐ | Posted | 121 | Type 3 | 11/30/20 | Reference 1 | SGDA | 8746 | John Doe | Journal 1 | ▽ |

FIG. 8

IDENTIFYING SUSPICIOUS ENTRIES IN A DOCUMENT MANAGEMENT SYSTEM

CROSS REFERENCE TO RELATED APPLICATIONS

This application is a continuation of co-pending U.S. application Ser. No. 17/234,362, filed Apr. 19, 2021, which is incorporated by reference in its entirety.

BACKGROUND

Field of Disclosure

The present disclosure generally relates to a document management system, and more specifically to identification of suspicious entries in documents managed by the document management system.

Description of the Related Art

Entities use a document management system to electronically store data related to the entities. The data is stored in one more documents in the document management system. Various users such as employees of the entities create new entries in the document that describe operations related to the entities. Conventional document management systems are unable to identifying suspicious entries that are indicative of suspicious activity at the entities.

SUMMARY

In one embodiment, a document management system manages documents of an entity. The document management system monitors for entries in a document that are suspicious. Entries in the document are classified by the document management system as a "suspicious entry" or a "non-suspicious entry." In one embodiment, a suspicious entry is indicative of potentially malicious activity at the entity.

To classify entries in the document, the document management system stores a security policy for the document. The security policy includes a plurality of security rules where each security rule defines distinct attributes of a suspicious entry. Entries in the document are compared with the security policy to classify the entries as either a suspicious entry or a non-suspicious entry. In one embodiment, the document management system generates a list of suspicious entries included in the document for review.

BRIEF DESCRIPTION OF DRAWINGS

FIG. 4 is an example of document according to one embodiment.

FIG. 5 is an example of an entry in the document according to one embodiment.

FIG. 6 is an example of a security policy for a document, according to one embodiment.

FIG. 7 is an example notification of suspicious entries in a document according to one embodiment.

FIG. 8 is an example list of suspicious entries in a document according to one embodiment.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Document Management System Environment

Figure 1:
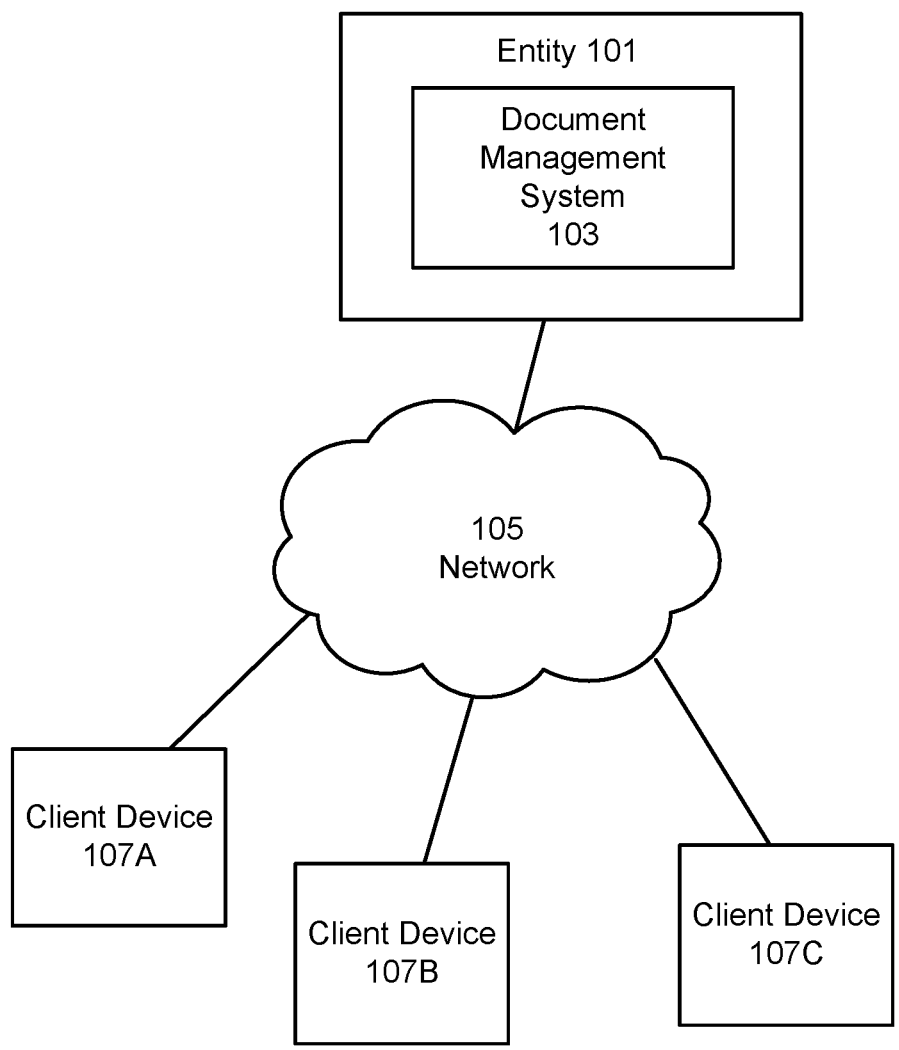
FIG. 1 is a high-level block diagram illustrating an embodiment of an environment for entry classification according to one embodiment.

FIG. 1 is a high-level block diagram illustrating an embodiment of an environment 100 of a document management system 103 for identifying suspicious entries in documents of an entity 101. The entity 101 may represent a single entity in one embodiment. In other embodiments, the entity 101 may represent a group of entities that belong to a single entity. An example of an entity 101 included in the environment is an automobile dealership or a group of automobile dealerships. However, the entity 101 can be any type of entity that requires the identification of suspicious entries in documents. The documents managed by the document management system 103 may include any type of data related to the entity 101.

Figure 10:
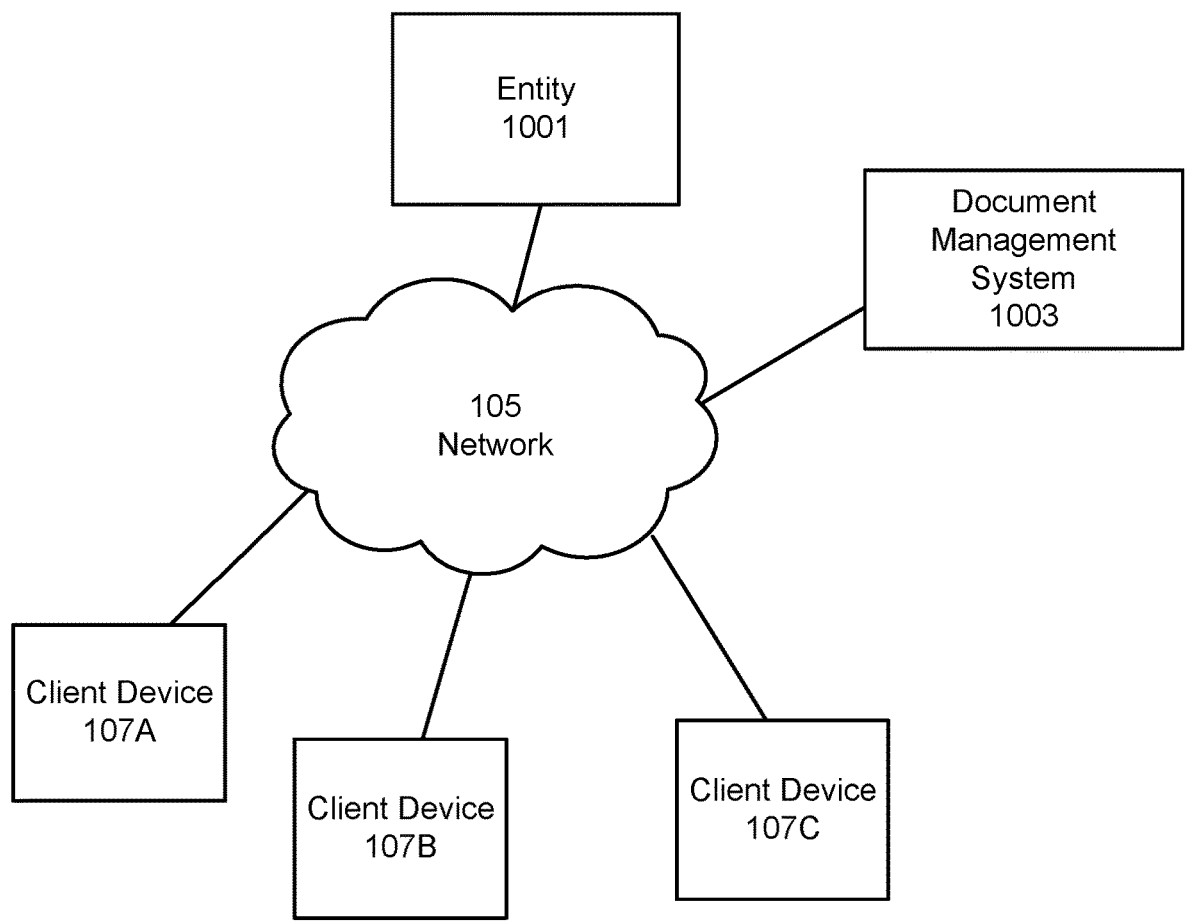
FIG. 10 is a high-level block diagram illustrating another embodiment of an environment for entry classification according to one embodiment.

In one embodiment, the environment 100 includes the entity 101 and a plurality of client devices 107A to 107C connected to each other via a network 105. As shown in FIG. 1, the enterprise 101 includes a document management system 103. Note that in another embodiment such as shown in FIG. 10, the document management system 103 may be separate from the entity 101 as will be further described below with respect to FIG. 10. Any number of document management systems, entities, and client devices may be present in other embodiments.

The network 105 provides a communication infrastructure between the parties included in environment 100. The network 105 is typically the Internet, but may be any network, including but not limited to a Local Area Network (LAN), a Metropolitan Area Network (MAN), a Wide Area Network (WAN), a mobile wired or wireless network, a private network, or a virtual private network.

Client devices 107 may include any device having an application that communicates with the document management system 103. For example, a client device 107 may be a mobile device or personal computer. Generally, client devices 107 represent devices of the entity 101. Representatives of the entity 101 use the client devices 101 to access entries in one or more documents stored by the document management system 103.

Accessing a document stored by the document management system 103 allows users to view existing entries in the document, add new entries to the documents, modify existing entries in the documents, and/or delete existing entries in the document. In one embodiment, the client device 107 may include an application that allows interaction with the document management system 103 to access documents stored by the document management system 103. The application may be a dedicated application specifically designed (e.g., by the organization responsible for the document management system 103) to enable interactions with the document management system 103.

The document management system 103 manages one or more documents that store data related to the entity 101. Users of client devices 107 may access a document managed by the document management system 103 to add new entries to the document. In one embodiment, a new entry to the document describes an activity at the entity 101. The document management system 103 analyzes the new entry to classify the entry as either "suspicious" or "non-suspicious." An entry classified as suspicious indicates that the activity described by the entry is potentially malicious. As will be further described below, the document management system 103 generates a list of suspicious entries in the document that may be reviewed to confirm malicious activity at the entity 101.

Document Management System

Figure 2:
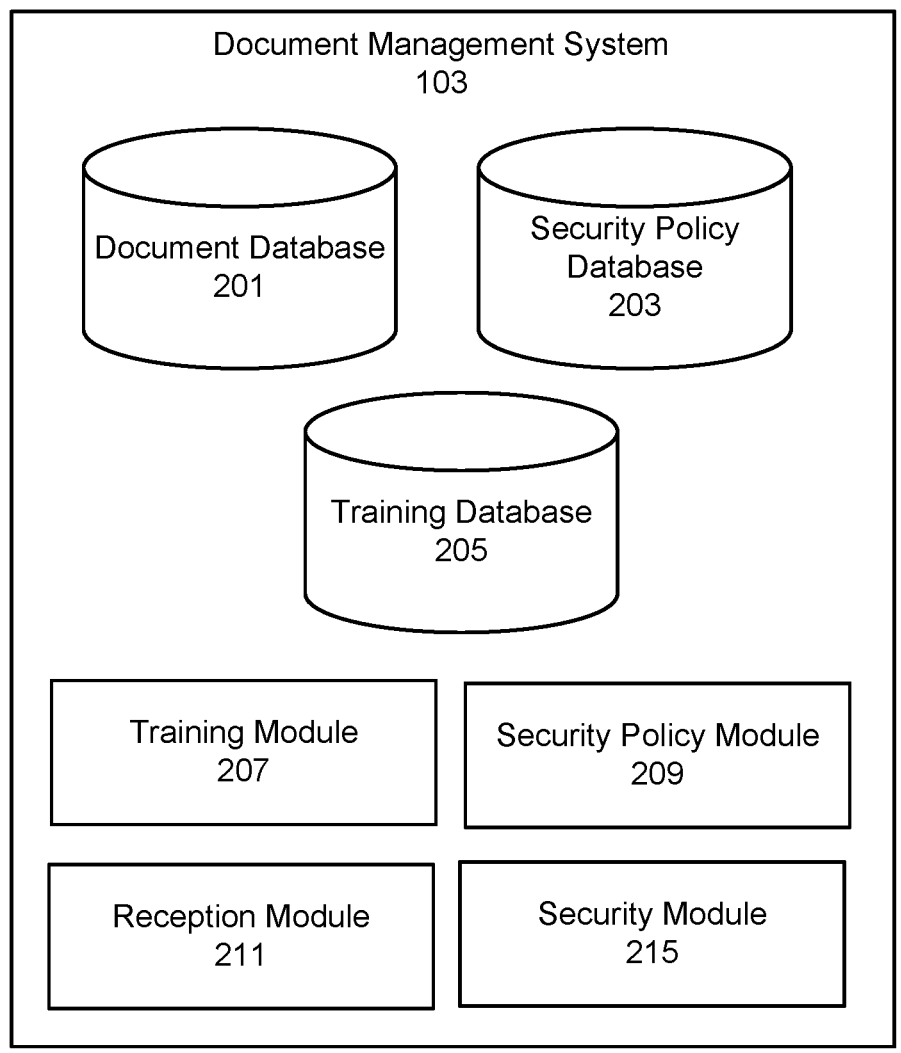
FIG. 2 is a high-level block diagram illustrating a detailed view of a document management system, according to one embodiment.

FIG. 2 is a high-level block diagram illustrating a detailed view of the document management system 103 of FIG. 1. In one embodiment, the document management system 103 includes a document database 201, a security policy database 203, a training database 205, a training module 207, a security policy module 209, a reception module 211, and a security module 215. Note that in other embodiments, the document management system 103 may include other modules and/or databases than those illustrated in FIG. 2.

The document database 201 stores one or more documents of the entity 101. An example of a document stored in the document database 201 is a ledger that includes data related activities of the entity 101. The ledger may include multiple entries that are organized into groups of one or more journals and/or identifiers, for example. However, any organizational format may be used to organize data stored in a document.

FIG. 4 is an example document 300 according to one embodiment. FIG. 4 illustrates a list view of a plurality of entries included in the document 400. As shown in FIG. 4, the entries included in the document 400 are arranged in a series of rows. For example, the document includes entries 401A to 401C arranged in separate rows. Each entry 401 includes a plurality of entry attributes. The entry attributes included of an entry include a plurality of fields and a corresponding value for each field. The entry attributes of the entry describe an activity at the entity 101.

In one embodiment, each entry shown in the list view of entries shown in FIG. 4 is selectable to access a detailed view of the entry. Selecting an entry from the list view results in a display of a detailed view of the entry. FIG. 5 is an example of a detailed view of an entry according to one embodiment. The detailed view 500 of the entry includes data such as one or more postings 501 made to the entry. Each post to the entry includes entry attributes such as fields and values for the fields.

Referring back to FIG. 2, in one embodiment the security policy database 203 stores security polices for documents managed by the document management system 103. In one embodiment, a security policy for a document includes a plurality of security rules where each security rule defines distinct attributes of a suspicious entry. The security policy is used by the document management system 103 to classify an entry in the document as suspicious or non-suspicious, as further described below.

The training database 205 stores training data. In one embodiment, the training data is used to train the security policy module 207 to dynamically generate security rules. In one embodiment, the training data may include different training groups of training entries where each training group is associated with a different type of activity at the entity 101 over a period of time (e.g., 3 months). An example of a type of activity is entries made to a particular destination in the document. Each training group of training entries may include a first sub-group of training entries related to a specific type of activity at the entity 101 where each training entry in the first sub-group is classified as a non-suspicious entry and a second sub-group of training entries related to the specific type of activity at the entity 101 where each training entry in the second sub-group is classified as a suspicious entry. In one embodiment, the first sub-group with non-suspicious training entries represents attributes of non-suspicious trends of activity associated with the sub-group whereas the second sub-group with suspicious training entries represents attributes of suspicious trends of activity associated with the sub-group.

The training module 207 trains the security policy module 209 to automatically generate security rules for a security policy of a document. In one embodiment, the training module 207 trains the security policy module 209 to generate security rules for the security policy of the document using the different training groups of training entries stored in the training database 205. The training module 207 may train the security policy module 209 to generate one or more security rules for each type of activity that occurs at the entity 101 using the training data.

To train the security policy module 209, the training module 207 extracts training attributes of the training data. The training attributes extracted by the training module 209 from the training data serve as descriptive, quantitative representations of the training data for use in training the security policy module 209. In one embodiment, the training module 209 generates different groups of extracted training attributes where each group of extracted training attributes is associated with a corresponding one of the training groups of training entries. Each group of extracted training features may include a sub-group of attributes that represent the suspicious training entries in the group and a sub-group of attributes that represent the non-suspicious training entries in the group. The combination of the various attributes extracted from training data serves as feature vectors that characterize the training data.

The training module 209 applies the features vectors that characterize the training data to the security policy module 205 as an input to the security policy module 205. The training module 209 trains the security policy module 205 to learn a set of weights on training attributes of the training data so that the security policy module 205 can automatically generate security rules for a security policy. Thus, the trained security policy module 205 is trained to recognize suspicious activity from the training data and generate rules that allow the document management system 103 to identify potentially malicious activity from entries in the document.

In one embodiment, the training module 209 will re-train the security policy module 205 using updated training data. In one embodiment, the updated training data includes new entries to the document over a period of time that are classified by the document management system 103 as suspicious and non-suspicious. In another embodiment, the training module 209 re-trains the security policy module 205 based on feedback received on the classifications made by the security module 215 as will be described below. By re-training the security policy module 205, the security policy module 205 can improve the generation of security rules that better reflect malicious and non-malicious activities of the entity 101.

The security policy module 205 generates a security policy for a document that includes one or more security rules where each security rule defines distinct security attributes of a suspicious entry. The security attributes included in a security rule describe attributes of a suspicious entry which is representative of a malicious activity at the entity 101. Entries in the document having attributes that match the security attributes of any one of the security rules included in the security policy is classified as a suspicious entry. Entries to the document having attributes that do not match the security attributes of any one of the security rules included in the security policy is classified as a non-suspicious entry.

In one embodiment, the security attributes of a security rule may include a particular destination in the document that is associated with the security rule. The destination in the document describes where in the document an entry will be posted to according to one embodiment. An example of a destination is an identifier and/or journal in the document.

The security attributes for a security rule may also specify one or more names of representatives within the entity 101. An entry to the document that is made by one of the names in the security policy may indicate that the entry is suspicious, for example. The name may be a specific user (e.g., a name of the user or user identifier) or the name of a role type (i.e., occupation type) of a representative of the entity 101 such as "clerks." In yet another example, the name in a security rule may specify a name of a group of representatives that are subject to the security rule. For example, all representatives who are in the "service" group may be subject to the security rule.

The security attributes for a security rule may specify invalid dates and/or times for entries. The invalid dates and/or times indicate when the entity 101 is non-operational (e.g., closed). Thus, new entries to the document should not be created during the invalid dates and/or times. In another example, the security attributes for a security rule may specify data values that are outside a valid range or valid percentage that is associated with a field in the document. In yet another example, the security attributes include one or more locations of client devices 107 where any entries made from the locations is suspicious. Note that the security attributes described herein are merely exemplary. A security rule may include different security attributes than described herein.

Figure 3:
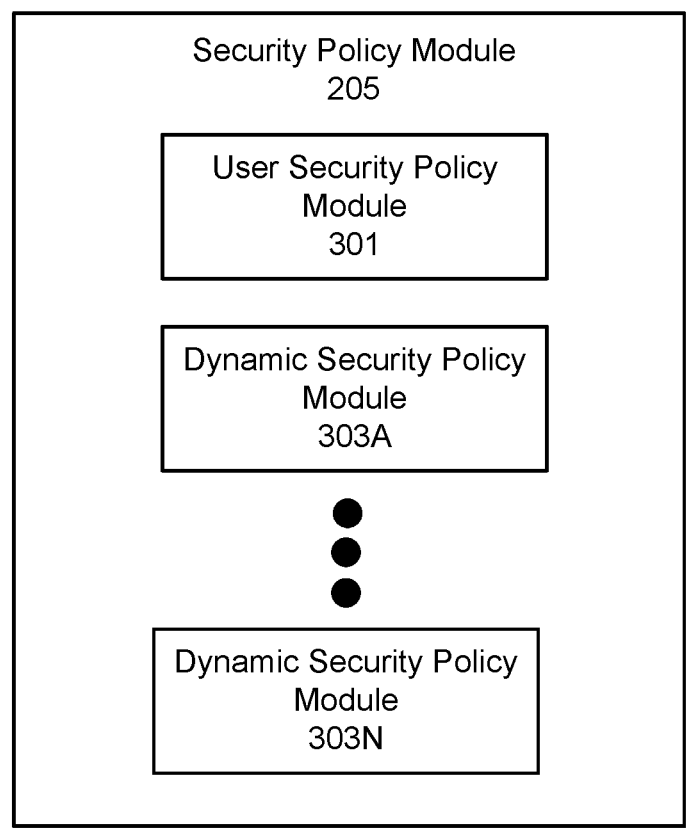
FIG. 3 a high-level block diagram of a security policy module included in the document management system, according to one embodiment.

FIG. 3 is a high-level block diagram of the security policy module 205 according to one embodiment. The security policy module 205 includes a user security policy module 301 and a set of dynamic security policy modules 303A to 303N where N is a positive integer. The security policy module 205 may include different modules than shown in FIG. 3 in other embodiments.

In one embodiment, the user security policy module 301 generates a security rule based on a definition received from a user (e.g., an administrator) of the document management system 103. Thus, the user security policy module 301 generates a user defined security rule. In one embodiment, the definition received by the user security policy module 301 from the client device 107 of the user includes at least the destination associated with the security rule and one security attribute for the security rule that indicates any entries to the destination are suspicious.

In one embodiment, the dynamic security policy modules 303A to 303N are machine-learned neural network models. Any machine learning algorithm may be used by the machine-learned neural network models such as linear regression, logistic regression, SVM, etc. The dynamic security policy modules 303A to 303N are trained by the training module 207 to automatically generate security rules for the security policy. Each dynamic security policy module 303 is associated with a type of activity that occurs in the entity 101 and is trained to generate security rules for the type of activity. For example, dynamic security policy module 303A is trained to generate security rules for entries of activities associated with a first destination in the document whereas dynamic security policy module 303B is trained to generate security rules for entries of activities associated with a second destination in the document that is distinct from the first destination. Thus, the dynamic security policy modules 303A to 303N automatically generate security rules to identify different types of suspicious entries in the document that are representative of malicious activity at the entity 101 due to being trained on the attributes of the suspicious and non-suspicious entries included in the training data. In one embodiment, a representative of the entity 101 may modify a security rule that is automatically generated by a dynamic security policy module 303.

To automatically generate security rules for the document, each dynamic security policy module 303 retrieves entries from the document that correspond to the type of activity that the dynamic security policy module 303 is trained to generate rules for. The entry attributes of each retrieved entry are input to the dynamic security policy module 303 and the dynamic security policy module 303 generates one or more security rules according to the entry attributes. The security rules generated by each dynamic security policy module 303 represent activity that is malicious as it is not consistent with the non-malicious activity in the document.

FIG. 6 shows an example security policy that includes a plurality of security rules. The security rules are organized based on whether the security rule is user defined or dynamically generated by the security policy module 209. For example, the security policy may include user defined rule 601 that classifies any entries to the document made to identifier 1 (e.g., the destination) between Monday to Friday before 8 AM and after 5 PM as a suspicious entry.

The security policy shown in FIG. 6 may include a plurality of dynamically created security rules 603. For example, the security policy may include a dynamically generated rule 603A for identifier 5 (e.g., a destination) that classifies any entries including values that are less than a threshold percentage of a predetermined value as suspicious. The security policy may also include a dynamically generated rule 603B that classifies any entries to identifier 3 (e.g., a destination) made by a group of users 1 and a group of users 2 as suspicious. Lastly, the example security policy may also include a dynamically generated rule 603C that classifies any entries to any identifier (e.g., a destination) in the document from a client device 107 located in Africa and South America as suspicious.

Referring back to FIG. 2, the document management system 103 includes a reception module 211. The reception module 211 receives requests from client devices 107 to access a document stored by the document management system 103 and processes the requests. That is, the reception module 211 module fulfills the requests by the client devices 107 to access the requests. For example, the reception module 211 retrieves requested entries of the document from the document database 201 and transmits the retrieved entries to the devices 107 that submitted the requests. In another example, the reception module 211 adds new entries to the document based on requests to add the new entries from the client devices 107.

In one embodiment, the reception module 211 extracts entry attributes from the entries being accessed. The entry attributes of an entry may include fields in the entries, values of the fields, and a destination associated with the entry (e.g., identifier or journal). The reception module 211 may also extract from the request from the client device request attributes including a type of access request (e.g., view, add, modify, or delete) and attributes of the user (e.g., user identifier) that provided the request. The reception module 211 may forward the extracted attributes to the security module 215.

In one embodiment, the security module 215 classifies entries in the document as suspicious or non-suspicious according to the security policy for the document. In one embodiment, the security module 215 classifies new entries to the document as suspicious or non-suspicious. The entries may be classified at the time of the request to add the new entries is made. Alternatively, the security module 215 may classify new entries for the document in batches. For example, new entries over a period of time (e.g., the past week) are aggregated and classified by the security module 215. In one embodiment, the security module 215 retroactively classifies existing entries in the document as suspicious or non-suspicious.

To classify an entry, the security module 215 compares the attributes of the entry and the request with the security policy for the document to determine whether to classify the entry as suspicious or non-suspicious. In one embodiment, all of the attributes of the entry and request must match all of the security attributes in at least one security rule in order for the security module 215 to classify the entry as suspicious. Thus, a partial match of a security rule would not cause the security module 215 to classify an entry as suspicious.

Although the security module 215 may classify a new entry as suspicious, the entry is still entered in the document according to one embodiment. In one embodiment, the security module 215 generates a security alert that is transmitted to an administrator of the document management system 103. The security alert indicates one or more suspicious entries in the document were identified. For example, FIG. 7 illustrates an example of the document shown in FIG. 3 that includes a security alert 701 of suspicious entries.

In one embodiment, the security module 215 generates a list of suspicious entries in the document. The list is transmitted to a client device 107 of the administrator of the document management system 103 or any other representative of the entity 101, for example. Each of the suspicious entries may be reviewed. In one embodiment, the security module 215 receives from the client device 107 of the administrator feedback on the classification. The feedback confirms whether the classification of the entry as suspicious is valid or invalid. The administrator can further investigate the malicious activity associated with the suspicious entry if the classification of the entry as suspicious is valid. In contrast, no further investigation is required if the classification of the entry is invalid.

FIG. 8 illustrates an example list of suspicious entries 800. The suspicious entries are arranged in a series of rows where each row includes a suspicious entry. Each suspicious entry includes a feedback mechanism 801. The feedback mechanism 801 is used to provide feedback whether a classification of an entry as suspicious is valid or invalid. In the example shown in FIG. 8, the feedback mechanism 800 is a drop down menu to provide feedback that "Yes" the entry is suspicious or "No" the entry is not suspicious. Other types of feedback mechanisms may be used.

In one embodiment, the security module 215 transmits the received feedback to the training module 205. The training module 205 re-trains the security policy module 209 according to the feedback. That is, the training module 205 may adjust the weights of the feature vectors according to whether the feedback indicates classifications of entries are valid or invalid. By retraining the security policy module 209 based on the feedback, the security policy module 209 improves classification of entries in the document.

In an alternative embodiment, the security module 215 automatically prevents new entries from being added to the document that are classified as suspicious. The security module 215 may provide a notification to the client device 207 attempting to add the suspicious entry that the entry is suspicious. Thus, the entry would require revision or approval from the administrator to be entered in the document.

Process for Securing a Document

Figure 9:
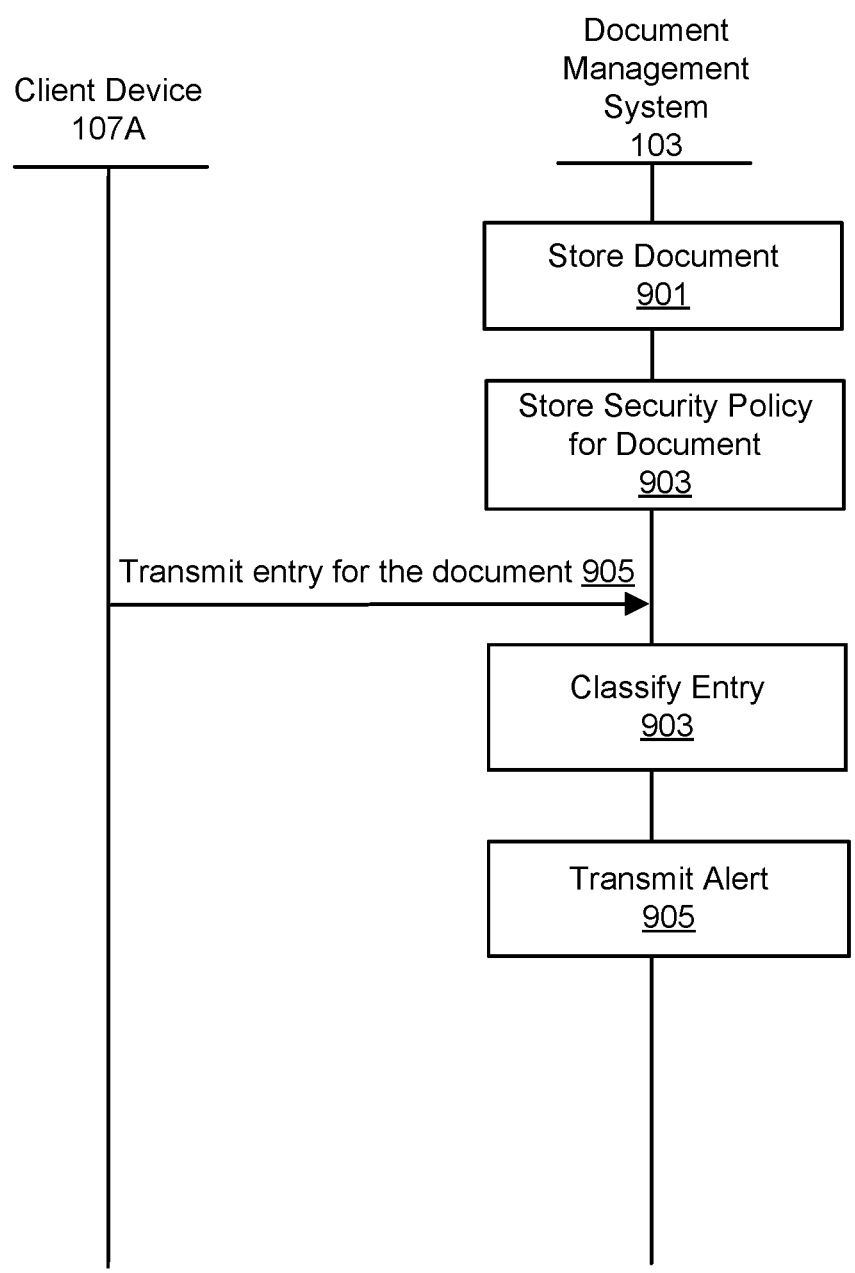
FIG. 9 is an interaction diagram illustrating a process of identifying a suspicious entry in a document according to one embodiment.

FIG. 9 is an interaction diagram illustrating a process identifying suspicious entries in a document according to one embodiment. In one embodiment, document management system 103 stores a document 901. The document includes entries comprising data related to the entity 101. The document management system 103 also stores 903 a security policy for the document. The security policy for the document includes a plurality of security rules where each security rule defines distinct attributes of a suspicious entry.

The client device 107A transmits 905 an entry for the document. The document management system 103 classifies 903 the entry as suspicious. In one embodiment, the document management system 103 classifies the entry by comparing attributes of the entry and the request with the security rules included in the security policy. The document management system 103 classifies the entry as a suspicious entry responsive to a match between the attributes of the entry and security attributes of at least one security rule. The document management system 103 transmits 905 an alert responsive to the entry being classified as suspicious.

Alternate Document Management System Environment

FIG. 10 is a high-level block diagram illustrating an alternate embodiment of an environment 1000 of a document management system for identifying suspicious entries of documents of an entity 1001. The environment 1000 is similar to the environment 100 shown in FIG. 1. The environment 1000 includes an entity 1001, a document management system 1003 and client devices 107. The entities in environment 1000 perform similar functions as their counterparts in environment 100 shown in FIG. 1 thus the description is omitted for readability.

However, in environment 1000 the document management system 1003 is separated from entity 1001. In the example of FIG. 10, a separate entity may be responsible for operating the document management system 1003 that manages documents on behalf of the entity 1001. Alternatively, the same entity may be responsible for both the entity 1001 and the document management system 1003, but the document management system 1003 is separated from the entity 1001.

Hardware Components

Figure 11:
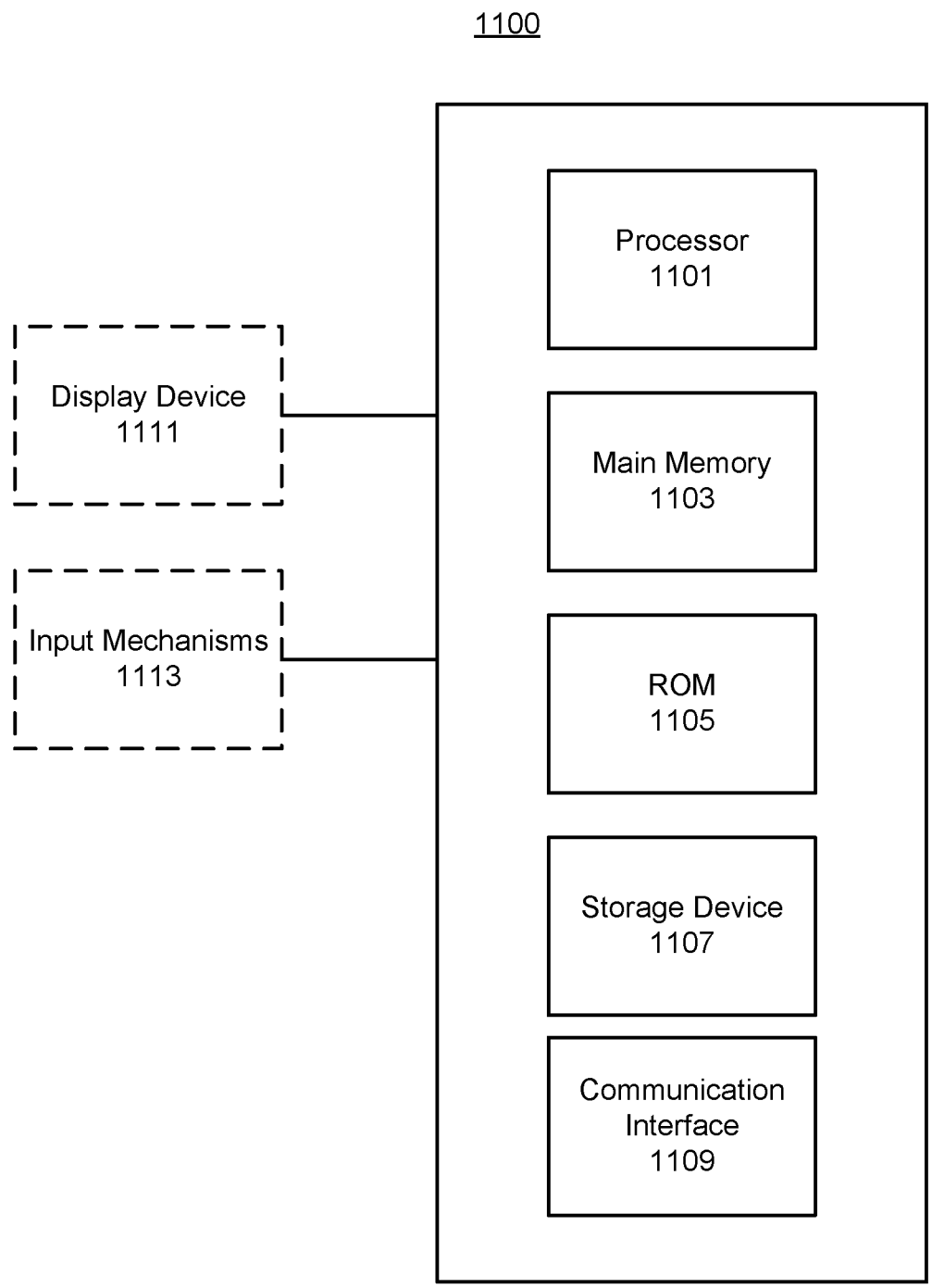
FIG. 11 is system diagram of a computer system, according to one embodiment.

FIG. 11 is a diagram illustrating a computer system 1100 upon which embodiments described herein may be implemented within the document management system 103/1003 and client devices 107. For example, in the context of FIG. 1, the document management system 103/1003 and client devices 107 may each be implemented using a computer system such as described by FIG. 11. The document management system 103/1003 may also be implemented using a combination of multiple computer systems as described by FIG. 1011.

In one implementation, the document management system 103/1003 and client devices 107 each include processing resources 1101, main memory 1103, read only memory (ROM) 1105, storage device 1107, and a communication interface 1109. The document management system 103/1003 and client devices 107 each include at least one processor 1101 for processing information and a main memory 1103, such as a random access memory (RAM) or other dynamic storage device, for storing information and instructions to be executed by the processor 1001. In one embodiment, multiple processors are employed by the document management system 103/1003 to perform the techniques described above in order to improve efficiency of the document management system 103/1003 and reduce computation time when securing documents. Main memory 1103 also may be used for storing temporary variables or other intermediate information during execution of instructions to be executed by processor 1101. The document management system 103/1003 and client devices 107 may each also include ROM 1105 or other static storage device for storing static information and instructions for processor 1101. The storage device 1107, such as a magnetic disk or optical disk or solid state memory device, is provided for storing information and instructions.

The communication interface 1109 can enable each of document management system 103/1003 and client devices 107 to communicate with each other through use of a communication link (wireless or wireline). Each of document management system 103/1003 and client devices 107 can optionally include a display device 1111, such as a cathode ray tube (CRT), an LCD monitor, an LED monitor, OLED monitor, a TFT display or a television set, for example, for displaying graphics and information to a user. An input mechanism 1113, such as a keyboard that includes alphanumeric keys and other keys, can optionally be coupled to the computer system 1100 for communicating information and command selections to processor 1101. Other non-limiting, illustrative examples of input mechanisms 1113 include a mouse, a trackball, touch-sensitive screen, or cursor direction keys for communicating direction information and command selections to processor 1101 and for controlling cursor movement on display device 1111.

Examples described herein are related to the use of the document management system 103/1003 and client devices 107 for implementing the techniques described herein. According to one embodiment, those techniques are performed by each of the document management system 103/1003 and client devices 107 in response to processor 1101 executing one or more sequences of one or more instructions contained in main memory 1103. Such instructions may be read into main memory 1103 from another machine-readable medium, such as storage device 1107. Execution of the sequences of instructions contained in main memory 1103 causes processor 1101 to perform the process steps described herein. In alternative implementations, hard-wired circuitry may be used in place of or in combination with software instructions to implement examples described herein. Thus, the examples described are not limited to any specific combination of hardware circuitry and software.

Furthermore, it has also proven convenient at times, to refer to arrangements of operations as modules, without loss of generality. The described operations and their associated modules may be embodied in software, firmware, hardware, or any combinations thereof.

Reference in the specification to "one embodiment" or to "an embodiment" means that a particular feature, structure, or characteristic is included in at least one embodiment of the disclosure. The appearances of the phrase "in one embodiment" in various places in the specification are not necessarily referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects disclosed herein include process steps and instructions described herein in the form of a method. It should be noted that the process steps and instructions described herein can be embodied in software, firmware or hardware, and when embodied in software, can be downloaded to reside on and be operated from different platforms used by a variety of operating systems.

The embodiments discussed above also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings described herein, and any references below to specific languages are provided for disclosure of enablement and best mode.

While the disclosure has been particularly shown and described with reference to one embodiment and several alternate embodiments, it will be understood by persons skilled in the relevant art that various changes in form and details can be made therein without departing from the spirit and scope of the invention.

What is claimed is:

1. A computer-implemented method of identifying suspicious entries in a document management system, the computer-implemented method comprising:

storing, by the document management system, a document including a plurality of entries of an entity associated with the document, each entry from the plurality of entries describing an activity at the entity at a given date and the entry added to the document by a respective employee of the entity;

storing, by the document management system, a security policy associated with the document, the security policy including one or more security rules defining attributes of suspicious entries in the document, a suspicious entry indicative of an activity at the entity described by the suspicious entry being potentially malicious, wherein the document management system is a machine learned model trained to generate at least one of the one or more security rules associated with the document;

receiving, by the document management system, a request by an employee of the entity to add a candidate entry to the document, the candidate entry describing an activity related to an object located at the entity and including a plurality of fields and a value for each of the plurality of fields that are associated with the activity described by the candidate entry, wherein at least one value for one of the plurality of fields is provided by the employee of the entity in the request by the employee to add the candidate entry to the document;

classifying, by the document management system, the candidate entry as suspicious based on a comparison of a plurality of attributes of the candidate entry and the security policy prior to the candidate entry that is included in the request from the employee being added to the document or being rejected from being added to the document;

automatically adding, by the document management system, the candidate entry to the document responsive to the candidate entry being classified as suspicious despite the candidate entry being classified as suspicious;

transmitting, by the document management system, an alert that the candidate entry classified as suspicious was added to the document;

receiving, by the document management system, feedback on the classification of the candidate entry as suspicious, the feedback indicative of whether the classification is valid or invalid;

retraining the document management system that is the machine learned model based on the received feedback; and generating, by the retrained document management system, one or more additional security rules associated with the document.

2. The computer-implemented method of claim 1, further comprising:

receiving a definition for one of the one or more security rules from a client device, the definition including a plurality of attributes of malicious activity associated with the one of the one or more security rules.

3. The computer-implemented method of claim 1, further comprising:

training the document management system using training data to generate the security rules for the document, the training data including suspicious entries and non-suspicious entries;

applying the document to the machine learned model; and automatically generating, by the document management system, a security rule for the document based on the application of the document to the machine learned model.

4. The computer-implemented method of claim 3, wherein the alert is transmitted to a client device of an administrator of the document management system and the feedback is from the client device of the administrator confirming or disputing the classification of the candidate entry as suspicious, the computer-implemented method further comprising:

preventing the candidate entry from being added to the document responsive to the administrator confirming the classification of the candidate entry as accurate; and adding the candidate entry to the document responsive to the administrator disputing the classification of the candidate entry as suspicious.

5. The computer-implemented method of claim 4, wherein the alert includes a list of a plurality of candidate entries classified as suspicious including the candidate entry classified as suspicious, the method further comprising:

receiving, for each of the plurality of candidate entries, feedback from the client device of the administrator including either a first indication confirming the classification of the candidate entry as accurate or a second indication disputing the classification of the candidate entry as suspicious.

6. The computer-implemented method of claim 1, further comprising:

automatically rejecting the request to add the candidate entry to the document responsive to the candidate entry being classified as the suspicious entry.

7. The computer-implemented method of claim 1, wherein classifying the candidate entry comprises:

extracting attributes of the candidate entry; and comparing the extracted attributes of the candidate entry with the attributes of at least one of the one or more security rules included in the security policy;

wherein the candidate entry is classified as suspicious responsive to all of the extracted attributes of the candidate entry matching all of the attributes of the at least one of the one or more security rules, and the candidate entry is classified as non-suspicious responsive at least one of the extracted attributes of the candidate entry not matching at least one of the attributes of the at least one of the one or more security rules.

8. The computer-implemented method of claim 7, further comprising:
automatically generating at least one security rule for entries assigned to a first destination in the document but the at least one security rule not applicable to entries assigned to a second destination in the document.

9. The computer-implemented method of claim 1, wherein the attributes included in a security rule from the one or more security rules includes a destination in the document and at least one of a name of a representative of the entity, an invalid date range, an invalid time range, an invalid data value, or a location.

10. A non-transitory computer-readable storage medium storing executable code for identifying suspicious entries in a document management system, the code when executed by a computer processor causes the computer processor to perform steps including:
storing, by the document management system, a document including a plurality of entries of an entity associated with the document, each entry from the plurality of entries describing an activity at the entity at a given date and the entry added to the document by a respective employee of the entity;
storing, by the document management system, a security policy associated with the document, the security policy including one or more security rules defining attributes of suspicious entries in the document, a suspicious entry indicative of an activity at the entity described by the suspicious entry being potentially malicious, wherein the document management system is a machine learned model trained to generate at least one of the one or more security rules associated with the document;
receiving, by the document management system, a request by an employee of the entity to add a candidate entry to the document, the candidate entry describing an activity related to an object located at the entity and including a plurality of fields and a value for each of the plurality of fields that are associated with the activity described by the candidate entry, wherein at least one value for one of the plurality of fields is provided by the employee of the entity in the request by the employee to add the candidate entry to the document;
classifying, by the document management system, the candidate entry as suspicious based on a comparison of a plurality of attributes of the candidate entry and the security policy prior to the candidate entry that is included in the request from the employee being added to the document or being rejected from being added to the document;
automatically adding the candidate entry to the document responsive to the candidate entry being classified as suspicious despite the candidate entry being classified as suspicious;
transmitting an alert that the candidate entry classified as suspicious was added to the document;
receiving feedback on the classification of the candidate entry as suspicious, the feedback indicative of whether the classification is valid or invalid;
retraining the document management system that is the machine learned model based on the received feedback; and
generating, by the retrained document management system, one or more additional security rules associated with the document.

11. The non-transitory computer-readable storage medium of claim 10, wherein the code when executed by the computer processor further causes the computer processor to perform steps including:
receiving a definition for one of the one or more security rules from a client device, the definition including a plurality of attributes of malicious activity associated with the one of the one or more security rules.

12. The non-transitory computer-readable storage medium of claim 10, wherein the code when executed by the computer processor further causes the computer processor to perform steps including:
training the document management system using training data to generate the security rules for the document, the training data including suspicious entries and non-suspicious entries;
applying the document to the machine learned model; and
automatically generating a security rule for the document based on the application of the document to the machine learned model.

13. The non-transitory computer-readable storage medium of claim 12, wherein the alert is transmitted to a client device of an administrator of the document management system and the feedback is from the client device of the administrator confirming or disputing the classification of the candidate entry as suspicious, the code when executed by the computer processor further causes the computer processor to perform steps including:
preventing the candidate entry from being added to the document responsive to the administrator confirming the classification of the candidate entry as accurate; and
adding the candidate entry to the document responsive to the administrator disputing the classification of the candidate entry as suspicious.

14. The non-transitory computer-readable storage medium of claim 13, wherein the alert includes a list of a plurality of candidate entries classified as suspicious including the candidate entry classified as suspicious, the code when executed by the computer processor further causes the computer processor to perform steps including:
receiving, for each of the plurality of candidate entries, feedback from the client device of the administrator including either a first indication confirming the classification of the candidate entry as accurate or a second indication disputing the classification of the candidate entry as suspicious.

15. The non-transitory computer-readable storage medium of claim 12, wherein classifying the candidate entry comprises:
extracting attributes of the candidate entry; and
comparing the extracted attributes of the candidate entry with the attributes of at least one of the one or more security rules included in the security policy; wherein the candidate entry is classified as suspicious responsive to all of the extracted attributes of the candidate entry matching all of the attributes of the at least one of the one or more security rules, and the candidate entry is classified as non-suspicious responsive at least one of the extracted attributes of the candidate entry not matching at least one of the attributes of the at least one of the one or more security rules.

16. The non-transitory computer-readable storage medium of claim 10, wherein the attributes included in a security rule from the one or more security rules includes a destination in the document and at least one of a name of a representative of the entity, an invalid date range, an invalid time range, an invalid data value, or a location, wherein the code when executed by the computer processor further causes the computer processor to perform steps including:
    automatically generating at least one security rule for entries assigned to a first destination in the document but the at least one security rule not applicable to entries assigned to a second destination in the document.

17. A document management system for identifying suspicious entries in the computer system, comprising:
    one or more computer processors; and
    a non-transitory computer-readable storage medium storing code, the code when executed by the one or more computer processors cause the one or more computer processors to perform steps comprising:
    storing, by the document management system, a document including a plurality of entries of an entity associated with the document, each entry from the plurality of entries describing an activity at the entity at a given date and the entry added to the document by a respective employee of the entity;
    storing, by the document management system, a security policy associated with the document, the security policy including one or more security rules defining attributes of suspicious entries in the document, a suspicious entry indicative of an activity at the entity described by the suspicious entry being potentially malicious, wherein the document management system is a machine learned model trained to generate at least one of the one or more security rules associated with the document;
    receiving, by the document management system, a request by an employee of the entity to add a candidate entry to the document, the candidate entry describing an activity related to an object located at the entity and including a plurality of fields and a value for each of the plurality of fields that are associated with the activity described by the candidate entry, wherein at least one value for one of the plurality of fields is provided by the employee of the entity in the request by the employee to add the candidate entry to the document;
    classifying, by the document management system, the candidate entry as suspicious based on a comparison of a plurality of attributes of the candidate entry and the security policy prior to the candidate entry that is included in the request from the employee being added to the document or being rejected from being added to the document;
    automatically adding, by the document management system, the candidate entry to the document responsive to the candidate entry being classified as suspicious despite the candidate entry being classified as suspicious;
    transmitting, by the document management system, an alert that the candidate entry classified as suspicious was added to the document;
    receiving, by the document management system, feedback on the classification of the candidate entry as suspicious, the feedback indicative of whether the classification is valid or invalid;
    retraining the document management system that is the machine learned model based on the received feedback; and
    generating, by the retrained document management system, one or more additional security rules associated with the document.

\* \* \* \* \*